United States Patent
Fuelling et al.

[11] 3,790,234
[45] Feb. 5, 1974

[54] RAIL GUIDING DEVICE FOR VEHICLE SEATS

[75] Inventors: Wolfgang Fuelling, Solingen; Werner Osenberg, Opladen, both of Germany

[73] Assignee: Bremsley AG, Solingen-Ohligs, Germany

[22] Filed: May 23, 1972

[21] Appl. No.: 256,112

[30] Foreign Application Priority Data
Nov. 18, 1971 Germany................... P 21 57 232.7

[52] U.S. Cl.................... 308/6 R, 308/3.6, 312/343
[51] Int. Cl.............................................. F16c 29/00
[58] Field of Search....... 308/3.6, 3.8, 6 R; 312/348, 312/345, 346, 347, 341 NR, 343, 342, 344, 333; 248/393

[56] References Cited
UNITED STATES PATENTS

| | | | |
|---|---|---|---|
| 3,702,717 | /1972 | Gutner | 308/3.6 |
| 2,318,363 | 5/1943 | Boddy | 312/343 |
| 3,393,019 | 7/1968 | Fraser | 308/6 |
| 2,759,773 | 8/1956 | Wilmer | 308/3.6 |

FOREIGN PATENTS OR APPLICATIONS

| | | | |
|---|---|---|---|
| 355,108 | 8/1931 | Great Britain | 312/346 |
| 153,456 | 11/1972 | Great Britain | 312/348 |
| 500,589 | 1954 | Canada | 312/343 |

Primary Examiner—Charles J. Myhre
Assistant Examiner—R. H. Lazarus
Attorney, Agent, or Firm—Arthur O. Klein

[57] ABSTRACT

A rail guiding device for a vehicle seat comprising a first rail part which is to be fixed in position, and a second rail part which can move in relation to it, one of said parts at least partially enveloping the other, the enveloping rail part extending into longitudinal grooves in the enveloped rail part to provide an interlocking action, the rail part having the longitudinal grooves being made in box girder form, and fixed externally placed support faces are provided for two opposite limbs of the enveloping rail part. The support surfaces are preferably formed by the limbs, overlapping the side flanks of the enveloping rail part, of an outer, third rail, the third rail being U-shaped in cross-section and having a web which is connected with the wall section of the enveloped rail part extending between the longitudinal grooves in the enveloped rail part.

7 Claims, 5 Drawing Figures

PATENTED FEB 5 1974

RAIL GUIDING DEVICE FOR VEHICLE SEATS

The present invention relates to vehicle seats, and more particularly to a rail guiding device for vehicle seats, comprising a rail part which is to be fixed in position, and a rail part which can move in relation to it, the one rail part extending into longitudinal grooves in the other rail part to provide an interlocking action.

In accordance with a prior proposal connected with a rail or sliding mount for seats, more particularly motor vehicle seats, capable of being adjusted in the longitudinal direction of the vehicle, U-limbs both of the holding and also of the held rail parts were to be so profiled that guide channels, for example for balls, resulted, with the purpose of taking up tilting forces owing to the interengagement. The limbs of the holding rail part were, as seen in cross-section, made so that at first they converge towards each other in order, after the formation of a sufficiently broad running surface at the same level, to run in a downward direction again. The held rail part, which straddled the limbs of the holding rail part in this manner, had a diverging limb, which thus ran parallel to the holding section and the limb was then bent inwards again (see German patent specification 1,077,544). The construction in this respect is advantageous in as far as commercially available girder material can be used. Such a rail or sliding guiding arrangement is, however, not capable of taking up loads in an optimum manner, more particularly owing to design features. There is the danger that the free U-limbs may become displaced so that they may come out of engagement with each other. This leads to a reduction in safety. It is to be remembered that in the case of extremely high loads, more particularly occurring when safety belts are attached to the seat frame, values of 20 g and more may arise. The new safety regulations which are being discussed in some countries prescribe load carrying values which are considerably higher than conventional regulations.

One aim of the invention is that of providing a rail guiding device of the type described which has an optimum loading characteristic and in whose manufacture commercially available girder material can be used in an advantageous manner.

The present invention consists of a rail guiding device for a vehicle seat comprising a rail part which is to be fixed in position, and a rail part which can move in relation to it, the one rail part extending into longitudinal grooves in the other rail part to provide an interlocking action, in which the rail part having the longitudinal grooves is made of box girder, and externally placed support faces are provided for the two limbs of the enveloping rail part.

In accordance with the development of the invention the support surfaces are formed by the limbs, overlapping the side flanks of the enveloping rail part, of an outer rail, which is U-shaped in cross-section, and which has a web, which is connected with the wall section, extending between the longitudinal grooves. In this respect the longitudinal groove sliding surfaces can be directed obliquely outwards approximately down as far as the level of a neck edge of the U-shaped outer rail.

Furthermore, in accordance with the preferred feature of the invention, a covering wall lying opposite to the wall of the box girder, provided with the longitudinal grooves of the box girder rail part, is equipped with sliding shoes. These shoes can be mounted like plugs in holes in the covering wall.

In accordance with a further preferred feature of the invention, the limbs of the outer rail extend at least for half the height of the interlocking rail part, and the latter has adjacent to its residual freely exposed part an opening for the engagement of a rail locking device, which cooperates with a row of tooth holes on the side wall of the box girder rail part.

In accordance with such a construction, a rail guiding device for vehicle seats is provided which is able to resist both constant tension or pulling forces and also extremely high tilting forces of short duration in the direction perpendicular to the plane of sliding of the rails. The leading rail part is made of box girder. This is capable of withstanding high loads in the transverse direction. The forces transmitted by the interlocking guided or held rail part act in the plane of the girder wall and not, as previously, against the side faces of freestanding U-limbs. Even a force component acting in this direction cannot, owing to the closed nature of the girder, bring about any displacement of the limbs. Furthermore, the two limbs of the interlocking rail part cannot be displaced owing to the externally arranged support faces which in an advantageous fashion are formed by the limbs, overlapping the side faces of the interengaging rail part, of an outer rail which is U-shaped in cross-section. Such an outer rail, which can also be made integrally with the box girder rail part, further increases the resistance to flexure of the rail guiding device, something which is of advantage, more especially, in the case of rail guiding devices of excessive length. In the case of the use of several components this outer rail is connected at the position adjacent to its U-web with a wall section, extending between the longitudinal grooves, of the box girder. The attachment can be made, for example, by welding or by conventional attachment elements. The constructional feature, also adopted, of aligning the longitudinal groove sliding surfaces obliquely downwards in an outer direction to approximately the neck edge of the outer rail of U-shaped cross-section serves not only for guidance but also for stabilizing the freestanding U-limbs which are engaged from outside. In order to improve the sliding properties, while dispensing with balls which on the whole bring about a broadening of the rail guiding device, use is made of shoes. The shoes are mounted in the manner of plugs in the box girder rail part. The shoes can be made of plastic material. Instead of using separate shoes it is also possible, by producing a grained effect, to form sliding projections from the material of the box girder rail or of the held rail part. The rail guiding device in accordance with the invention can be supplied as an entire finished unit. It can therefore be provided with an opening for engagement of a rail locking device. The limbs of the outer rail extend for approximately half the height of the engaging rail part so that the remaining height is available for the provision of the opening, adjacent to which a row of teeth holes can be provided for engagement of detent means of the locking means.

Further advantages and details of the subject matter of the invention are now described with reference to an embodiment as shown in the accompanying drawing.

Figure 1:
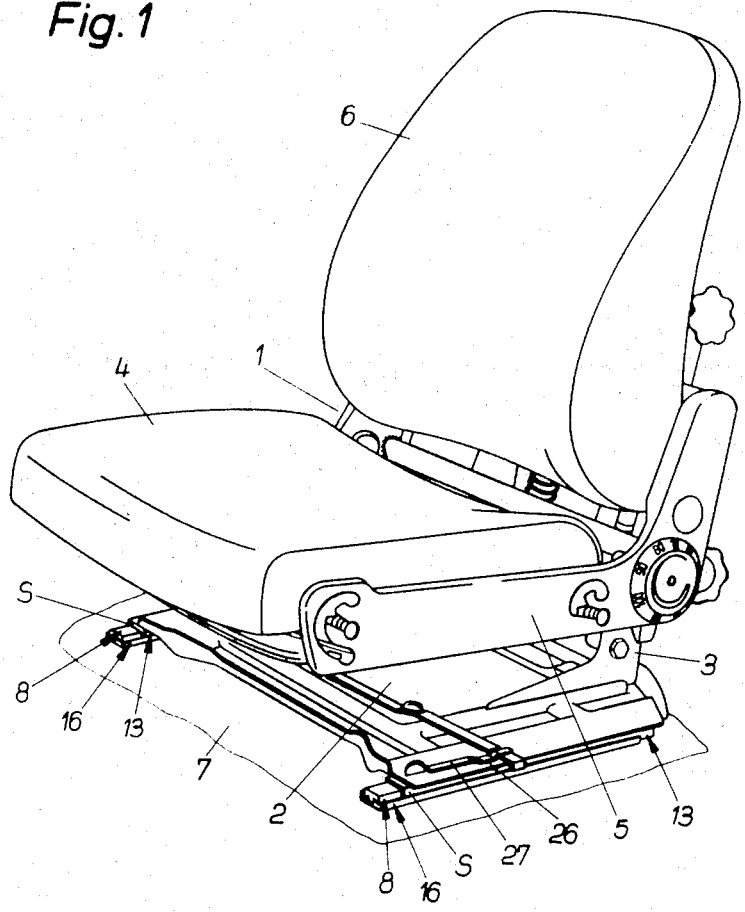
FIG. 1 is a view in perspective of a vehicle seat equipped with a rail guide device in accordance with the invention.

The vehicle seat provided with a rail guiding device in accordance with the invention comprises a seat frame 1 which consists of a base plate 2, to which there is attached at an acute angle the seat back 3. The seat back has guide means, not shown in detail, which make possible an adjustment in the height of the carrier 5 supporting the seat cushion 4. On this carrier 5 there is also mounted the back cusion 6, which can be adjusted in height with the carrier 5 and, using suitable means, can be adjusted as to tilt or slope. The carrier 5 is furthermore provided with means which make possible a change in the vertical position of the seat cushion 4 in relation to the carrier.

The base plate 2 of the seat frame 1 rests on rail guides S arranged in a pair and lying in the longitudinal direction of the vehicle. These rail guides are shown in cross-section in FIGS. 2 and 3.

Each rail guide S consists of a rail part T1 which is fixed on the vehicle floor 7 by screws, riveting or welding, and a rail part T2 which can be moved in relation to the rail part T1 and is suitable connected with the seat frame 1. The rail part T1 is encompassed or enveloped by the rail part T2.

As seen in cross-section, the rail part T1 consists of a box girder 8 of substantially rectangular cross-section. At its bottom corner edges the girder 8 has longitudinal grooves 9 which are formed by the inwardly pressed corner zones of the box girder. The corner zones extend into the interior of the box girder from the bottom. The shaping of the grooves 9 is such that undercut longitudinal groove guide surfaces 11 are produced. The wall section 12, forming this sliding surface, also runs so as to slope obliquely downwards to the outside.

The encompassing rail part T2, when also seen in section, is substantially in the form of an U-girder 13. The two U-flanks 13' are first directed so as to be parallel to the course of the shorter box girder walls 8' and are then continued at the position adjacent to the longitudinal grooves 9 as retaining extensions 14, which overlap the longitudinal groove guiding surface 11. The retaining projections 14 are aligned so as to be parallel to the wall sections 12.

The two U-flanks 13', forming the retaining projections 14, are provided with externally placed support surfaces. The latter insure that the limbs 13' are not pushed outwards away from each other when an extremely high transversely directed force is exerted.

The supporting surfaces 15' are formed by the limbs 15, overlapping the side flanks of the encompassing rail part T2, of an outer rail 16 which in cross-section is U-shaped and these supporting surfaces 15' coact with the external support surfaces of the two U-flanks 13'. The U-shaped limbs 15 run parallel to the flanks 13' and the wall sections 8'.

The limbs 15 are directed upwards. The U-leg 16 consequently lies on the vehicle bottom 17 and on the side of the cavity of the U-girder it is connected with the wall section 8" (extending between the longitudinal grooves 9) of the box girder rail part 8. This wall section has a comparatively broad extent owing to the comparatively narrow width of the longitudinal grooves 9 so that there is a large area contact between the box girder 8 and the outer rail 16.

Figure 2:
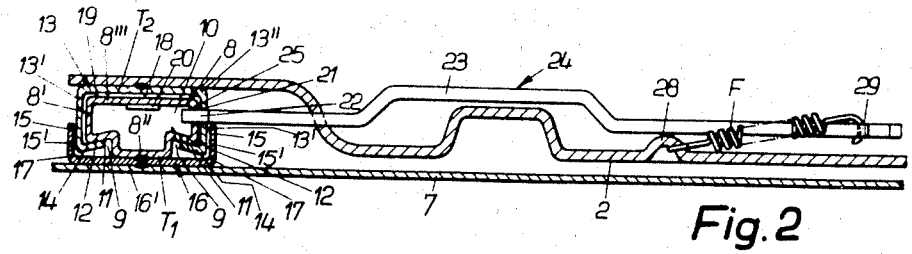
FIG. 2 is a cross-section through the rail guiding device adjacent to the left-hand side of the seat.
Figure 3:
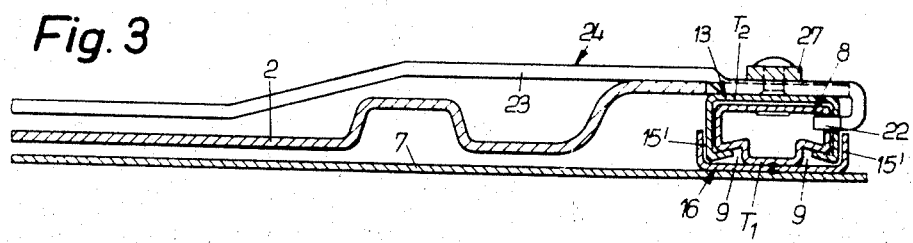
FIG. 3 is a corresponding vertical section adjacent to the right-hand side of the seat.
Figure 4:
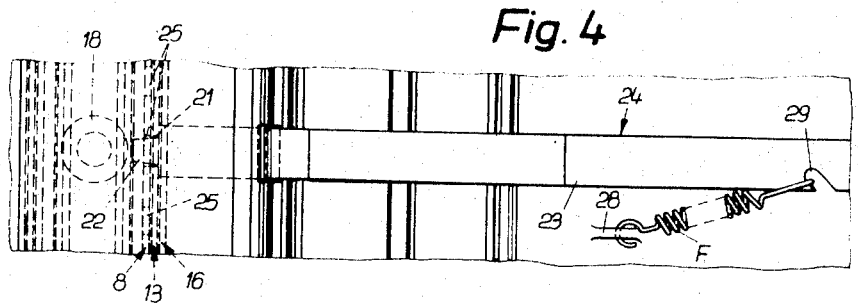
FIG. 4 is a partial plan view of what is shown in FIG. 2.
Figure 5:
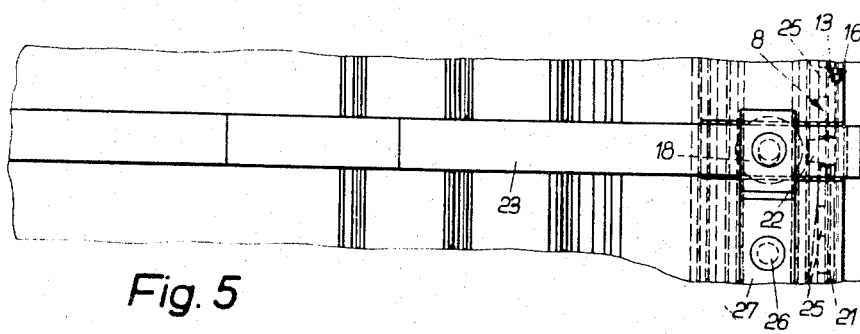
FIG. 5 is a similar plan view of what is shown in FIG. 3.

As can be seen in FIGS. 2 and 3, the longitudinal groove sliding surface 11 is so set at an oblique angle that an imaginary extension of this sliding surface is directed generally towards the neck edge 17 of the outer rail 16.

The rail parts T1 and T2, which can be slid in relation to each other, are provided with sliding shoes 18 in order to improve their sliding properties. These shoes are arranged with a greater or lesser spacing between them in the intermediate space 19 between the other wall 8''' of the box girder 8 and the oppositely placed covering wall 13'' of the rail part T2. The sliding shoes 18 are in the form of disc bodies, which extend in a plug-like projection 20 for being anchored in a hole in the wall 8'''. At this position there can be a short of swaged or press stud type of connection for holding the shoes in place.

As can furthermore be seen in FIGS. 2 and 3, the limbs 15 of the outer rail 16 extend only for about half the height of the encompassing rail part T2. Immediately above the free end face adjacent to the remainder of the height, which is freely exposed, the rail part T2 has an opening 21, into which there extends a rod 23, provided with a tooth-like detent projection 22, forming part of a rail locking device 24. The detent extension 22 is offset in relation to the breadth of the rod so that abutment shoulders are produced which engage the limbs 13'. In a corresponding position to the opening 21 the holding rail part T1 has a row of tooth holes, consisting of tandem-arranged openings 25.

In the case of the position shown in FIGS. 2 and 3, the rail parts are locked in relation to each other. The oppositely lying rod end (FIG 3) fits into the rail guiding device S on the right-hand side and its hooked end, which may possibly be provided with a tooth-like detent projection 22, extends simultaneously into the openings to be found on this side. At this position there is also the twin-armed lever 27, shown in FIG. 1, which is pivoted at 26. The rod 23 is bent so as to correspond in shape with the base plate which is ribbed to improve strength. The rod 23 is acted upon by a tension spring F. This is also fixed on an eye 28 formed in the base plate. The spring extends into a recess 29 of the rod 23.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A rail guiding device for a vehicle seat, comprising a first, outer, and a second, inner rail part, the two rail parts being telescopically related for relative longitudinal movement with the first rail part partially enveloping the second rail part, one of the rail parts being adapted to be mounted in a fixed position, the second rail part being in the form of a closed box girder and having longitudinal grooves therein, the first rail part having longitudinally extending flank overlapping the second rail part and provided with edge protions slidably and interlockingly received with the grooves in the second rail part, and externally placed fixed supporting and guiding members for the two flanks of the first rail part.

2. A device in accordance with claim 1 comprising a third rail which is U-shaped in cross-section and which includes said supporting and guiding members and which has a web, the web being connected with the wall section extending between the longitudinal grooves of the second rail part, the supporting and guiding members being formed by limbs overlapping the side flanks of the first, enveloping rail part.

3. A device in accordance with claim 2, in which the sliding surfaces of the longitudinal grooves in the second rail part are directed obliquely outwards approximately down as far as the level of a neck edge of the U-shaped third rail.

4. A device in accordance with claim 1, in which the covering wall of the box girder, such wall being opposite to the wall thereof provided with the longitudinal grooves, is provided with sliding shoes.

5. A device in accordance with claim 4, in which the shoes are mounted like plugs in holes in the covering wall of the second rail part.

6. A device in accordance with claim 1, in which the flanks of the first, outer rail extend at least for half the height of the second, inner interlocking rail part, and the latter has adjacent to its residual freely exposed part an opening for the engagement of a rail locking device, the rail locking device cooperating with a row of tooth holes on the side wall of the box girder rail part.

7. A rail guiding device for a vehicle seat, comprising in combination, a fixed inner rail part;

an outer rail part being telescopically, movably mounted on said inner rail part, said outer rail part having a pair of jaw like portions which partially envelop said inner rail part;

said inner rail part being formed as a closed box girder;

said pair of jaw like portions having outer lateral supporting surfaces;

and externally placed fixed supporting and guiding members having inner lateral supporting surfaces adapted to coact with the outer lateral supporting surfaces of said jaw like portions to laterally support said device.

* * * * *